(12) United States Patent
Utagaki et al.

(10) Patent No.: US 7,837,788 B2
(45) Date of Patent: Nov. 23, 2010

(54) FIBER REINFORCED CEMENT COMPOSITION AND PRODUCTS AND MANUFACTURING PROCESS

(75) Inventors: Kazuo Utagaki, Nagoya (JP); Tadashi Sugita, Nagoya (JP); Satoshi Takayama, Nagoya (JP)

(73) Assignee: Nichiha Corporation, Nagoya-shi (JP)

( * ) Notice: Subject to any disclaimer, the term of this patent is extended or adjusted under 35 U.S.C. 154(b) by 935 days.

(21) Appl. No.: 11/598,815

(22) Filed: Nov. 14, 2006

(65) Prior Publication Data

US 2008/0072797 A1 Mar. 27, 2008

Related U.S. Application Data

(63) Continuation-in-part of application No. 11/527,712, filed on Sep. 27, 2006.

(51) Int. Cl.
*C04B 7/02* (2006.01)
(52) U.S. Cl. .................. 106/713; 106/705; 106/716; 106/724; 106/731; 106/737; 106/DIG. 1; 264/333
(58) Field of Classification Search .......... 106/713.737, 106/705, 713, 716, 724, 731, 737, DIG. 1; 264/333
See application file for complete search history.

(56) References Cited

U.S. PATENT DOCUMENTS

| | | | |
|---|---|---|---|
| 3,972,972 A | | 8/1976 | Yano et al. |
| 4,101,335 A | | 7/1978 | Barrable |
| 4,101,652 A | * | 7/1978 | Bonati .......................... 424/49 |
| 5,188,889 A | | 2/1993 | Nagatomi et al. |
| 5,858,083 A | | 1/1999 | Stav et al. |
| 5,945,044 A | | 8/1999 | Kawai et al. |
| 6,001,169 A | | 12/1999 | Kawai |
| 6,138,430 A | * | 10/2000 | Van Acoleyen et al. .. 52/745.19 |
| 6,506,248 B1 | * | 1/2003 | Duselis et al. ............... 106/713 |
| 6,572,697 B2 | * | 6/2003 | Gleeson et al. ............. 106/705 |
| 6,605,148 B2 | | 8/2003 | Shirakawa et al. |
| 6,676,745 B2 | * | 1/2004 | Merkley et al. ............. 106/726 |
| 6,872,246 B2 | * | 3/2005 | Merkley et al. ............. 106/805 |
| 7,344,593 B2 | * | 3/2008 | Luo et al. .................... 106/726 |
| 7,621,087 B2 | | 11/2009 | Utagaki et al. |
| 2001/0047741 A1 | * | 12/2001 | Gleeson et al. ............. 106/709 |
| 2003/0205172 A1 | * | 11/2003 | Gleeson et al. ............. 106/679 |
| 2004/0168615 A1 | * | 9/2004 | Luo et al. .................... 106/805 |
| 2005/0235883 A1 | * | 10/2005 | Merkley et al. ............. 106/805 |
| 2006/0043627 A1 | | 3/2006 | Sugita et al. |
| 2006/0075931 A1 | | 4/2006 | Utagaki et al. |
| 2008/0148999 A1 | * | 6/2008 | Luo et al. .................... 106/805 |
| 2008/0203365 A1 | * | 8/2008 | Gleeson et al. ............. 252/601 |

FOREIGN PATENT DOCUMENTS

| | | | |
|---|---|---|---|
| JP | 54-99131 A | | 8/1979 |
| JP | 58-110443 A | | 7/1983 |
| JP | 61-256956 A | | 11/1986 |
| JP | 1-242452 A | | 9/1989 |
| JP | 3-97644 A | | 4/1991 |
| JP | 3-257052 A | | 11/1991 |
| JP | 4-42875 A | | 2/1992 |
| JP | 4-114937 A | | 4/1992 |
| JP | 4-160045 A | | 6/1992 |
| JP | 4-187552 A | | 7/1992 |
| JP | 4-193748 A | | 7/1992 |
| JP | 4-295072 A | | 10/1992 |
| JP | 4-305041 A | | 10/1992 |
| JP | 5-124845 A | | 5/1993 |
| JP | 5-229859 A | | 9/1993 |
| JP | 6-32643 A | | 2/1994 |
| JP | 6-56496 A | | 3/1994 |
| JP | 6-321602 A | | 11/1994 |
| JP | 6-329457 A | | 11/1994 |
| JP | 7-117027 A | | 5/1995 |
| JP | 8-32603 | | 3/1996 |
| JP | 9-87001 A | | 3/1997 |
| JP | 10-231161 A | | 9/1998 |
| JP | 11-322395 A | | 11/1999 |
| JP | 2000-264701 | | 9/2000 |
| JP | 2001-158678 A | | 6/2001 |
| JP | 2001-233653 A | | 8/2001 |
| JP | 2001-287980 A | | 10/2001 |
| JP | 2002-166406 A | | 6/2002 |
| JP | 3374515 | | 11/2002 |
| JP | 2003-146731 A | | 5/2003 |
| JP | 2004-196601 A | | 7/2004 |
| WO | WO 2006/025331 | | 3/2006 |

OTHER PUBLICATIONS

JP7291707 A (Kubota KK Teramoto Hiroshi) Nov. 7, 1995; abstract. See IDS submitted by applicants for their related U.S. Appl. No. 11/410,311 Utagaki.*
JP 8040758 A (Asahi Glass Co-Yada Akira) Feb. 13, 1996 abstract. See IDS submitted by applicants U.S. Appl. No. 11/410,311.*
JP 49045934 A (Kuraray) May 2, 1974 abstract. See this document submitted with applicants in U.S. Appl. No. 11/410,311.*
JP 49045935 A (Kuraray) abstract. See this document submitted with applicants in U.S. Appl. No. 11/410,311.*

(Continued)

*Primary Examiner*—Paul Marcantoni
(74) *Attorney, Agent, or Firm*—Birch, Stewart, Kolasch & Birch, LLP

(57) ABSTRACT

This invention is a fiber reinforced cement composition comprising the following raw materials: a hydraulic inorganic material, a siliceous material, and a woody reinforcement wherein the siliceous material is a mixture of an average particle size of not less than 15 um and not more than 50 um which is burned ash of coal and/or rhyolite and an average particle size of not less than 1 um and not more than 15 um which is burned ash of coal and/or rhyolite.

10 Claims, No Drawings

OTHER PUBLICATIONS

U.S. Appl. No. 11/354,241, filed May 15, 2006, K. Utagaki et al.
U.S. Appl. No. 11/410,311, filed Apr. 25, 2006, K. Utagaki et al.
U.S. Appl. No. 11/431,652, filed May 11, 2006, K. Utagaki et al.
Japanese Office Action issued on Jan. 12, 2010 in related JP Application No. 2004-251708.
Third-Party Submission document filed on Jan. 4, 2010 in related Japanese Patent Application No. 2004-251708.
Third-Party Submission document filed on Jan. 5, 2010 in related Japanese Patent Application No. 2004-251706.
Third-Party Submission document filed on Jan. 5, 2010 in related Japanese Patent Application No. 2004-251707.
Third-Party Submission Notice issued on Jan. 28, 2010 in related Japanese Patent Application No. 2004-251708.
Third-Party Submission Notice issued on Jan. 29, 2010 in related Japanese Patent Application No. 2004-251706.
Third-Party Submission Notice issued on Jan. 29, 2010 in related Japanese Patent Application No. 2004-251707.

* cited by examiner ize of not more than 2 mm, has a bulk specific gravity of not less than 0.1 and not more than 0.4, and inorganic aggregate comprising (A) and (B), in which inorganic aggregate (A) is spherical aggregate which has a particle size of not less than 1 μm and not more than 100 μm selected out of fly ash and spherical calcium silicate hydrates, in which inorganic aggregate (B) is a ultra-fine particle aggregate which has a particle size of not less than 0.01 μm and not more than 0.5 μm selected out of micro-silica, silica fume, natural pozzolan, diatomaceous earth, silica flower, aerosol.

FIBER REINFORCED CEMENT COMPOSITION AND PRODUCTS AND MANUFACTURING PROCESS

RELATED APPLICATION

This application is a Continuation-in-Part Application of prior U.S. patent application Ser. No. 11/527,712, filed Sep. 27, 2006, the contents of which are incorporated herein by reference.

CROSS-REFERENCE TO RELATED APPLICATION

PCT/JP2005/015667
U.S. patent application Ser. No. 11/215,964
U.S. patent application Ser. No. 11/354,241
U.S. patent application Ser. No. 11/410,311
U.S. patent application Ser. No. 11/431,652

BACKGROUND OF THE INVENTION

1. Field of the Invention

The present invention relates to a fiber reinforced cement composition using a hydraulic inorganic material such as cement, products thereof and a manufacturing process thereof.

2. Description of the Related Art

The following description sets forth the inventor's knowledge of related art and problems therein and should not be construed as an admission of knowledge in the prior art.

Hitherto, for manufacturing process of fiber reinforced cement product using a hydraulic inorganic material such as cement, when the specific gravity of fiber reinforced cement product is high by adding a lot of powder, freezing and fusion resistance and bending strength improve basically.

But, if the product is hard by high specific gravity thereof, there is a problem in installation property such as nail performance.

Thus, nail performance is improved by adding woody reinforcement such as pulp in large quantities.

But when pulp is added in large quantities, noncombustible performance of product is lost, freezing and fusion resistance deteriorates again, too.

Thus, a special woody reinforcement such as needle-leaves-tree kraft pulp has recently been used as the woody reinforcement, and U.S. Patent Application Publication No. 2004/168615 discloses that quantity of pulp addition is held down using two kinds of particular pulp.

And, for reason of physical property enhancement, about powder rather than woody reinforcement, various lightweight aggregates addition is examined.

For example, in Japanese Patent No. 3374515, it is disclosed that the amount of not less than 5% by mass and not more than 30% by mass of vermiculite adds in cement molding composition.

In Japanese unexamined laid open patent publication No. 2000-264701, it is disclosed that wood fiber which specified average fiber length and average fiber width adds in matrix, furthermore, the amount of not less than 18% by mass and not more than 60% by mass of expanded inorganic material such as expanded perlite adds in matrix.

And, in Japanese patent Publication No. H08-32603, it is disclosed that lightweight cement molding composition for extrusion comprising cement, lightweight aggregate, inorganic aggregate, organic fiber, cellulose type additive, in which lightweight aggregate is fly ash which has average particle In the present invention, it is examined that a particle size of aggregate as well as a kind of aggregate, to get the fiber reinforced cement product having excellent properties in nail performance and freezing and fusion resistance.

The description herein of advantages and disadvantages of various features, embodiments, methods, and apparatus disclosed in other publications is in no way intended to limit the present invention. For example, certain features of the preferred embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY OF THE INVENTION

Under such circumstances, the problems to be solved by the invention are to provide a fiber reinforced cement composition for obtaining a fiber reinforced cement product which is excellent in bending strength, dimensional stability and installation property such as handling property, flexibility performance and nail performance, and not unevenness of specific gravity, as well as a process for manufacturing the product.

The present invention provides, as a means to solve the conventional problems, a fiber reinforced cement composition comprising the following raw materials: a hydraulic inorganic material, a siliceous material and a woody reinforcement, wherein the siliceous material is a mixture of an average particle size of not less than 15 μm and not more than 50 μm which is burned ash of coal and/or rhyolite and an average particle size of not less than 1 μm and not more than 15 μm which is burned ash of coal and/or rhyolite.

The effects of the present invention, it is possible to obtain a fiber reinforced cement product having good bending strength, dimensional stability and installation property such as handling property, flexibility performance and nail performance, and it is no problem for forming step.

The above and/or other aspects, features and/or advantages of various embodiments will be further appreciated in view of the following description. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

DETAILED DESCRIPTION OF THE INVENTION

The present invention will be explained in detail below.
At first, each of the raw materials used for the fiber reinforced cement composition is explained below.

[Hydraulic Inorganic Material]

A hydraulic inorganic material refers to a material which causes a hydration reaction upon contact with water to initiate hardening and includes cement and lime.

Among them, it is preferred to use portland cement as the hydraulic inorganic material in the present invention.

The portland cement includes ordinary portland cement, high early strength portland cement, ultra high early portland cement, moderate heat portland cement and sulfate resistant portland cement (according to ASTM (American Society for Testing and Materials international) C150, Standard Specification for Portland cement TypeI, TypeII, TypeIII, TypeIV and TypeV) are included.

Amongst, ordinary portland cement (according to ASTM C150, Type I, Type II or a blend thereof, and according to AASHTO (American Association of State Highway and Transportation Officials) M85, TypeI) is inexpensive and is for the use.

[Siliceous Material]

A siliceous material refers to a material which contains silica ($SiO_2$) as a chemical component.

In the present invention, examples of the siliceous material include silica sand, silica powder, diatomaceous earth, silica fume, blast furnace slag, steel slag and sodium silicate.

It is preferable in the present invention to use burned ash of coal and rhyolite.

Here, "burned ash of coal" is ash when coal is burned by thermal power generation, examples of burned ash of coal include fly ash, bottom ash, bet material ash.

Particularly, it is preferable in the present invention to use fly ash.

Here, "rhyolite" is volcanic rocks which is one of in igneous rocks, other examples of volcanic rocks includes andesite, basalt.

It is preferable to use rhyolite because silica content is higher more than others.

Furthermore, rhyolite is classified into pearlstone, obsidian and pitchstone, and it is preferable to use pearlstone.

Pearlstone is divided easily more than obsidian and pitchstone.

Pearlstone is called perlite as another name, it is a stone of raw material producing expanded perlite generally called perlite.

This pearlstone is divided or not divided, prepared particle size and sorted, it is burned at around 1000 degrees Celsius and inflated to about 5-25 times, as a result, expanded perlite is made.

In present invention, pearlstone (perlite) is the stone of raw material which is not burned and expanded.

Then, it is preferable to use two kinds of the siliceous material which is an average particle size of not less than 15 μm and not more than 50 μm and an average particle size of not less than 1 μm and not more than 15 μm.

The siliceous material which is an average particle size of not less than 15 μm and not more than 50 μm, become silica component of calcium silicate reaction and has a role of aggregate.

If an average particle size of the siliceous material is less than 15 μm, there is danger that the lightweight effect deteriorates, and if an average particle size of the siliceous material is more than 50 μm, there is danger that the surface characteristics of product deteriorates.

If the amount of the siliceous material which average particle size is not less than 15 μm and not more than 50 μm is a little, fiber reinforced cement product becomes fragile, whereby the resulting nail performance of the resulting product deteriorates, whereas if the amount of the siliceous material which average particle size is not less than 15 μm and not more than 50 μm is too much, it does not contribute to the development of strength of the fiber reinforced cement product, whereby the resulting product cannot get necessary strength.

The siliceous material which is an average particle size of not less than 1 μm and not more than 15 μm is so fine that the reaction activity of silica ingredient increases, and calcium silicate reaction advances conspicuously.

If an average particle size of the siliceous material is less than 1 μm, there is danger that the work efficiency turns worse, and if an average particle size of the siliceous material is more than 15 μm, there is danger that the reaction activity is not increased.

If the amount of the siliceous material which average particle size is not less than 1 μm and not more than 15 μm is a little, it does not contribute to the development of strength of the fiber reinforced cement product, whereby the resulting product cannot get necessary strength, whereas if the amount of the siliceous material which average particle size is not less than 1 μm and not more than 15 μm is too much, fiber reinforced cement product becomes fragile, whereby the resulting nail performance of the resulting product deteriorates.

And, in present invention, it is preferable to use dividing fly ash and/or dividing pearlstone.

When fly ash is used as the siliceous material, while fly ash is very inexpensive and thus economical and, in addition, the resulting product such as an external wall board is excellent in nail performance.

It is preferable that fly ash contains not less than 50% by mass and not more than 70% by mass of $SiO_2$ component.

Thus, it is preferable to use fly ash of Type F of ASTM C618. (Type F contains not less than 70% by mass of $SiO_2$+$Al_2O_3$+$Fe_2O_3$ component.)

Pearlstone is composed mainly of glassy substances and the siliceous content thereof is as high as about 80% by mass.

If it is divided for use, pearlstone can be used enough as silica component of calcium silicate reaction.

When the siliceous material is fly ash and/or pearlstone, it is preferable that the mass ratio of the siliceous material which average particle size is not less than 1 μm and not more than 15 μm to the siliceous material which average particle size is not less than 15 μm and not more than 50 μm is in range of from 25:75 to 75:25.

These siliceous material can use a just particle size, but it can be done in a predetermined particle size by mill such as roller mill and classifier such as air.

It is preferable in the present invention that the silica in the siliceous material is amorphous.

This is because a possibility of adverse effects (such as pneumoconiosis) of crystalline silica on a human body has been pointed out, just like asbestos cases.

It is possible to judge whether or not silica is crystalline by the appearance of the crystalline peaks of crystalline silica contained in quartz, tridymite or cristobalite by an X-ray diffraction.

Namely, quartz or the like is crystalline and thus if the peaks of quartz or the like are observed in a siliceous material, the silica component contained in the siliceous material is crystalline rather than amorphous.

Accordingly, such a siliceous material in which the peaks observed in quartz or the like in an X-ray diffraction are not observed is used in the present invention.

Fly ash contains some amount of crystalline silica depending on the type (about 10% by mass of quartz).

However, crystalline silica contained in the fly ash is converted to calcium silicate hydrates by calcium silicate reaction in an autoclave and crystalline silica decreases.

In addition by finely dividing fly ash into an average particle size of not more than 15 μm, the reaction activity is enhanced and thus a major part of the trace amount of crystalline silica contained in fly ash is converted to calcium silicate hydrates via curing in an autoclave and the crystalline silica almost disappears.

Thus, by using finely divided fly ash, it is possible to eliminate, subsequent to asbestos, a recent concern about the health issue (such as oncogenesis) caused by crystalline silica.

Pearlstone is similar to fly ash, too.

Furthermore, for strength improvement and/or specific gravity setting, the other amorphous silica such as silica fume and blast furnace slag and glass powder may be used as the siliceous material.

[Woody Reinforcement]

Examples of the woody reinforcement include woody pulp, wood fiber bundle, wood fiber, wood flake, wood wool and wood powder.

It is preferable to use woody pulp, more preferably needle-leaves-tree unbleached kraft pulp (NUKP), needle-leaves-tree bleached kraft pulp (NBKP), Laubholz unbleached kraft pulp (LUKP) and Laubholz bleached kraft pulp (LBKP), and particularly preferably needle-leaves tree pulps such as NUKP and NBKP.

It is preferable to set the freeness of pulp, i.e. the value measured according to Canadian standard measurement (Canadian standard freeness, hereinafter, referred to as CSF), which varies depending on the degree of beating of pulp, to be not more than 500 ml.

By using such a woody reinforcement of fine fibers, the woody reinforcement exists in a cement (powder) matrix in a high density to give a fiber reinforced cement product having an excellent toughness.

Furthermore, it is possible to reduce the cost by using additionally used paper as the woody reinforcement.

It is preferable to use used newspapers or corrugated cardboards as the used paper.

By adding the used paper in an appropriate amount, mixing property with cement powder is enhanced, thereby providing a fiber cement product excellent in handling property and nail performance.

It is preferable to use such the used paper having a fiber length of not less than 0.5 mm and not more than 3.0 mm, a fiber diameter of not less than 10 μm and not more than 100 μm, and a CSF of not more than 350 ml.

It is also preferable to use two kinds of woody reinforcement in a ratio of NUKP (NBKP) to used paper in a range of from 4:1 to 1:1.

If the ratio of the used paper to NUKP (NBKP) is more than 1:1, the resulting product contains a small amount of long fibers and thus becomes difficult to develop strength, whereas if the ratio of NUKP (NBKP) to used paper is more than 4:1, mixing with cement (powder) becomes difficult.

A woody reinforcement having a CSF of not less than 500 ml may be added as an auxiliary material.

[Mica]

Mica contributes to improvement in the dimensional stability of the product since it usually has a lamellar structure, is not hygroscopic and is a high elastic substance having a rigidity.

For example, if a fiber reinforced cement product without mica contains 15 to 18% by mass of water when it is sold, the size of the product tends to shrink as the water content thereof decreases upon natural evaporation of the internal water under environmental conditions.

However, if a fiber reinforced cement product contains mica, the dimension change is reduced.

The mica used in the present invention is preferably in the form of flakes having an average particle size of not less than 200 μm and not more than 700 μm, and an aspect ratio of not less than 60 and not more than 100.

Incidentally, the aspect ratio herein means the ratio of thickness relative to particle size.

[Water-Soluble Resin]

Examples of the water-soluble resin include polyvinyl alcohols, carboxymethyl cellulose, methyl cellulose, polyethylene oxides and polyvinyl ethers.

The water-soluble resin serves as a binder in the fiber reinforced cement product, enhances adhesion between the layers of the components contained in the product, and improves the bending strength, as well as freezing and fusion resistance of the product.

In addition, since the water-soluble resin has a water-retention action, it prevents the surface of the fiber reinforced cement product from drying in the course of autoclave curing and acts to uniform the water content, thereby achieving a uniform hardening-curing reaction.

A desirable water-soluble resin is a powdery polyvinyl alcohol resin having a saponification value of not less than 98% by mol.

Incidentally, the term "saponification value" means a percentage of the number of hydroxyl group relative to the total number of acetate group and hydroxyl group contained in a polyvinyl alcohol resin in a saponification reaction (a reaction to synthesize a polyvinyl alcohol resin by substituting the acetate group in a polyvinyl acetate with hydroxyl group).

A powdery polyvinyl alcohol resin having a saponification value of not less than 98% by mol is not soluble in water but merely swells at a normal temperature, and thus does not dissolve in the water of an aqueous slurry of raw materials at a normal temperature.

Therefore, in the after-mentioned slurry forming process, outflow of the polyvinyl alcohol resin is reduced, whereby the process yield does not lower, and the viscosity of the slurry does not raised, whereby the forming efficacy does not lower.

In the green sheet prepared by forming the slurry of raw materials, the powdery polyvinyl alcohol resin comes to dissolve in the water contained in the green sheet owing to the high temperature in an autoclave curing process.

Because the water content of the green sheet is low, a major part of the powdery polyvinyl alcohol resin remains in the green sheet in a balloon state in which the powdery polyvinyl alcohol resin is dissolved in water and a large amount of the polyvinyl alcohol resin in the balloon state exists in a final product, i.e. a fiber reinforced cement product.

Thus, the product is provided with a cushioning property due to the effect of the shape of balloon, whereby the internal stress which generates during freezing and fusion is absorbed and alleviated to enhance freezing and fusion resistance.

In addition, when a water-soluble resin is added, the water-soluble resin coats the surface of the particles of cement as a protecting colloid, which possibly affects the hydration reaction of the cement.

However, when a powdery polyvinyl alcohol resin is used, a major part of the resin remains in a state of balloon in the green sheet.

Thus it becomes difficult to coat the cement particles with the polyvinyl alcohol resin as a protecting colloid, whereby the effect of the resin on the hydration reaction of the cement is reduced.

[Other Component]

As the other component, the following components may be optionally added: mineral powders such as vermiculite, bentonite and dolomite; inorganic fibers such as wollastonite and glass fiber; organic fibers such as polypropylene fiber, acrylic fiber and aramid fiber; cement setting accelerators such as sodium aluminate, calcium formate, potassium sulfate, calcium sulfate, aluminum sulfate and calcium acetate; water-repellants or water-proofing agents such as wax, paraffin, silicone, succinic acid and surfactants; and inorganic light-weight materials such as pulverized woody cement products and inorganic products.

Incidentally, these illustrations do not restrict the present invention.

[Raw Material Composition of the Fiber Reinforced Composition]

The fiber reinforced cement composition is preferably composed of the following raw materials: not less than 25% by mass and not more than 45% by mass of the hydraulic inorganic material, not less than 50% by mass and not more than 65% by mass of the siliceous materials, not less than 5% by mass and not more than 12% by mass of the woody reinforcement, and not less than 1% by mass and not more than 7% by mass of mica, and not less than 0.25% by mass and not more than 1.5% by mass of the water-soluble resin.

If the amount of the hydraulic inorganic material is less than 25% by mass, development of the strength after first hardening in not sufficient, whereas if it is more than 45% by mass, the resulting fiber reinforced cement product becomes rigid and fragile.

If the amount of the siliceous material is less than 50% by mass, a siliceous component which reacts in a calcium silicate reaction is not enough, whereas if it is more than 65% by mass, a calcium component is not enough to leave an unreacted siliceous component.

If the amount of the woody reinforcement is less than 5% by mass, a problem with regard to toughness of the resulting fiber reinforced cement product occurs, whereas if it is more than 12% by mass, uniform dispersion thereof in the raw materials becomes difficult.

If the amount of mica is less than 1% by mass, it does not contribute to the dimensional stability of the resulting fiber reinforced cement product, whereas if it is more than 7% by mass, uniform dispersion thereof in the raw materials becomes difficult.

If the amount of the water-soluble resin is less than 0.25% by mass, it does not contribute to the development of strength, whereas if it is more than 1.5% by mass, improvement in the physical properties of the resulting product is not achieved.

A preferable mass ratio is obtained by using as the hydraulic inorganic material not less than 28% by mass and not more than 32% by mass of portland cement, and as the siliceous material not less than 54% by mass and not more than 58% by mass in total of fly ash and/or pearlstone which is an average particle size of not less than 15 μm and not more than 50 μm and finely dividing fly ash and/or finely dividing pearlstone which is an average particle-size of not less than 1 μm and not more than 15 μm, wherein the amount of finely dividing fly ash and/or finely dividing pearlstone which is an average particle size of not less than 1 μm and not more than 15 μm is not less than 25% by mass and not more than 75% by mass of the whole siliceous material consisting of fly ash and/or pearlstone and finely dividing fly ash and/or finely dividing pearlstone, and as the woody reinforcement not less than 8% by mass and not more than 12% by mass in total NUKP and/or NBKP and the used paper, wherein the amount of the used paper is not less than 20% by mass and not more than 50% by mass of the whole woody reinforcement consisting of NUKP and/or NBKP and the used paper, and as mica is not less than 2% by mass and not more than 5% by mass, and as the water-soluble resin is not less than 0.5% by mass and not more than 1.25% by mass.

In this case, it is preferable that the mass ratio of CaO to $SiO_2$ in the raw materials consisting of the hydraulic inorganic material and the siliceous material is in a range of from 23:77 to 40:60.

It is possible to set this mass ratio by analyzing the chemical composition each of the hydraulic inorganic material and the siliceous material.

[Manufacturing Process]

In a process for manufacturing a fiber reinforced cement product, the above-mentioned composition is mixed with water to give a slurry of raw materials.

The concentration of the slurry is in a range of from 3 to 15% by mass reduced to a concentration of solid content.

The slurry of raw materials is manufactured by a wet manufacturing process.

Examples of the wet manufacturing processes include Hatschek process, flow on process, filter pressing process, roll forming, extrusion, injection, Mazza pipe process, Magnani sheet process, hand lay-up process, molding and casting. Flow on process is employed for forming herein.

Namely, the "flow on process" is a process in which a slurry of raw materials is flow down on an endless felt provided with a suction unit below the felt and formed with suction-dehydration to give a green sheet (i.e. a soft wet sheet), and the green sheet is rolled up around a making roll to give a multi-layer sheet, and when the thickness of the multi-layer sheet reaches a predetermined thickness, the sheet is separated from the making roll to give a green mat.

The number of rolling around the making roll is preferably 6 to 15.

Then, the green mat is pressed with a pressure of 2 to 5 MPa.

Incidentally, the green sheet is rolled up around the making roll in layers in Hatschek process like in flow on process.

In the Hatschek process, forming speed is fast, and as the speed increases, the fibers are more readily orientated and the aspect ratio (length/breadth ratio) of the bending strength increases.

On the other hand, in the flow on process in which raw materials are flown down on the felt, fibers are not so readily orientated as in the Hatschek process, and thus the aspect ratio of the bending strength is not so increased as in the Hatschek process.

In addition, since plural butts each accommodating a cylinder are provided and a felt is run on the cylinders in the butts to transfer the slurry of raw materials to the felt in the Hatschek process, the green sheet which has been formed and dehydrated on the felt and rolled up around the making roll produces a laminar structure having the number of layers equivanlent to the number of the butts, and has a freezing and fusion resistance inferior to that of a green sheet obtained by the flow on process.

On the contrary, when the flow on process is employed, the resulting green sheet itself does not have laminar structure but the resulting green mat has a laminar structure having the number of layers equivalent to the number of rolling up around the making roll, and thus the resulting mat has s freezing and fusion resistance better than of the green mat obtained by Hatschek process.

Furthermore, in the Hatschek process, a felt is run on the cylinders in the butts to transfer the slurry of raw materials to the felt, and thus it is necessary to increase the number of the butt to increase the thickness of the resulting fiber reinforced cement product.

This is very uneconomical.

On the other hand, in the flow on process, since the thickness of the product can be increased readily by increasing the amount of the slurry of raw materials to be flown down on the felt, the flow on process is economical.

In addition, the bulk of the product can be increased prior to pressing in this process, whereby deep embosses can be formed on the green mat.

Therefore, it is preferable to adopt the flow on process.

In forming of this flow on process, it makes material slurry flow down on a felt, and it is aspirated from under the felt, and it dehydrates.

And, the green sheet is made on the felt from a place of flow on to a place of rolling up by a making roll.

It is possible to advance the calcium silicate hydrate reaction, and to have a role of aggregate by using both the siliceous material which is an average particle size of not less than 15 µm and not more than 50 µm and the finely dividing siliceous material which is an average particle size of not less than 1 µm and not more than 15 µm.

Subsequently, the press molded mat obtained by pressing the green mat is hardened at 40 to 80° C. for 12 to 24 hours and then cured in an autoclave.

Curing in an autoclave is preferably effected by raising the temperature to 150 to 180° C. in 3.5 hours, keeping the temperature for 6.5 hours and lowering the temperature in 6 hours.

Upon autoclave curing under such conditions, a silica component and an alumina component elute from the surface of mica, thereby roughening the surface of mica.

In addition, the calcium component eluted from cement or the like is liable to enter into the space among overlapped parts of mica fragments, and the calcium component reacts with the silica component and some amount of the alumina component both eluted from the surface of mica to produce a stable calcium silicate hydrate in the space among the overlapped parts of mica fragments, thereby firmly adhering the mica fragments.

During the autoclave curing, a kind of tobermorite having a card house structure which has a better crystalline property than that of the other kind of tobermorite is produced in a large amount, whereby the dimensional stability and the freezing and fusion resistance of the product are enhanced.

If the amount of the calcium component is too much relative to the amount of the siliceous component, a cement hydration predominantly occurs rather than a calcium silicate reaction, whereby the resulting fiber reinforced cement product becomes fragile and the crack resistance thereof decreases.

On the contrary, if the amount of the siliceous component is too much relative to the amount of the calcium component, unreacted siliceous component remains in a large amount and the amount of tobermorite produced is decreased, whereby the freezing and fusion resistance of the product lowered.

[Products]

Application of the fiber reinforced cement composition includes fiber reinforced cement sidings, glass fiber reinforced cement boards, pulp reinforced cement boards, wood fiber reinforced cement calcium silicate boards, fiber reinforced cement calcium silicate boards, slag cement perlite boards and the like, and all of these final products are referred to as fiber reinforced cement products.

[Coating Method]

Coating of the fiber reinforced cement product is effected, for example, by coating with a sealer the front face twice and the ends and the rear face once, applying an undercoating such as an aqueous emulsion type acryl resin paint or a silicone resin paint, applying an intermediate coating, and then applying a top coating such as an organic solvent solution type acryl resin paint, an aqueous emulsion type acryl resin paint or an organic solvent solution type silicone acryl resin paint.

[Installation Method]

As a method for installation of the fiber reinforced cement product of the fiber reinforced cement composition, it is preferable to effect, for example, in the case of fiber reinforced cement sidings, by nailing a first siding at the positions about 20 mm inside from or below the upper edge thereof, placing a second siding on the first siding in such a manner that the lower edge of the second siding overlaps the upper edge of the first siding by not less than 30 mm, and then nailing the second siding at the positions about 20 mm inside from the upper edge thereof according to a so-called lap boarding.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure.

The limitations in the claims are to be interpreted broadly based on the language employed in the claims and not limited to examples described in the present specification or during the prosecution of the application, which examples are to be construed as non-exclusive. For example, in the present disclosure, the term "preferable" is non-exclusive and means "preferable, but not limited to".

In this disclosure and during the prosecution of this application, the terminology "present invention" or "invention" is meant as non-specific, general reference and may be used as a reference to one or more aspect within the present disclosure.

The language present invention or invention should not be improperly interpreted as an identification of criticality, should not be improperly interpreted as applying across all aspects or embodiments (i.e., it should be understood that the present invention has a number of aspects and embodiments) and should not be improperly interpreted as limiting the scope of the application or claims.

In this disclosure and during the prosecution of this application, the terminology "embodiment" can be used to describe any aspect, feature, process or step, any combination thereof, and/or any portion thereof, etc. In some examples, various embodiments may include overlapping features.

DESCRIPTION OF THE PREFERRED EMBODIMENTS

In the following paragraphs, some preferred embodiments of the invention will be described with reference to the attached drawing by way of example and not limitation.

The slurry is caused to flow down on a felt and formed with dehydration to give a green sheet.

The green sheet is rolled up around a making roll to give a multilayer structure.

When the thickness of the sheet reaches a predetermined value, the sheet is separated from the making roll to give a green mat.

The mat is pressed with a pressure of 5 MPa, hardened and cured at 80° C. for 15 hours, and further cured in an autoclave at 170° C. for 7 hours to provide a fiber reinforced cement product.

Table 2

TABLE 1

| Raw material composition (% by mass) | Example 1 | Example 2 | Example 3 | Example 4 | Example 5 | Example 6 | Example 7 | Example 8 |
|---|---|---|---|---|---|---|---|---|
| Portland cement | 30 | 30 | 30 | 30 | 30 | 30 | 30 | 30 |
| Fly ash | 14 | 28 | 42 | 0 | 0 | 0 | 14 | 28 |
| Finely dividing fly ash | 42 | 28 | 14 | 0 | 0 | 0 | 0 | 0 |
| Pearlstone | 0 | 0 | 0 | 14 | 28 | 42 | 0 | 0 |
| Finely dividing pearlstone | 0 | 0 | 0 | 42 | 28 | 14 | 42 | 28 |
| Finely dividing obsidian | 0 | 0 | 0 | 0 | 0 | 0 | 0 | 0 |
| bottom ash | 0 | 0 | 0 | 0 | 0 | 0 | 0 | 0 |
| Blast furnace slag | 0 | 0 | 0 | 0 | 0 | 0 | 0 | 0 |
| Silica fume | 0 | 0 | 0 | 0 | 0 | 0 | 0 | 0 |
| NUKP | 8 | 0 | 4 | 8 | 8 | 8 | 8 | 8 |
| NBKP | 0 | 8 | 4 | 0 | 0 | 0 | 0 | 0 |
| Used newspaper | 2 | 2 | 2 | 2 | 2 | 2 | 2 | 2 |
| Mica | 3 | 3 | 3 | 3 | 3 | 3 | 3 | 3 |
| Polyvinyl alcohol resin | 1 | 1 | 1 | 1 | 1 | 1 | 1 | 1 |

| Raw material composition (% by mass) | Example 9 | Example 10 | Example 11 | Example 12 | Example 13 | Example 14 | Example 15 | Example 16 |
|---|---|---|---|---|---|---|---|---|
| Portland cement | 30 | 30 | 30 | 30 | 30 | 30 | 30 | 30 |
| Fly ash | 42 | 0 | 0 | 0 | 0 | 20 | 28 | 0 |
| Finely dividing fly ash | 0 | 42 | 28 | 14 | 14 | 28 | 0 | 0 |
| Pearlstone | 0 | 14 | 28 | 42 | 34 | 0 | 0 | 0 |
| Finely dividing pearlstone | 14 | 0 | 0 | 0 | 0 | 0 | 0 | 28 |
| Finely dividing obsidian | 0 | 0 | 0 | 0 | 0 | 0 | 28 | 0 |
| bottom ash | 0 | 0 | 0 | 0 | 0 | 0 | 0 | 28 |
| Blast furnace slag | 0 | 0 | 0 | 0 | 0 | 8 | 0 | 0 |
| Silica fume | 0 | 0 | 0 | 0 | 8 | 0 | 0 | 0 |
| NUKP | 8 | 8 | 8 | 8 | 8 | 8 | 8 | 8 |
| NBKP | 0 | 0 | 0 | 0 | 0 | 0 | 0 | 0 |
| Used newspaper | 2 | 2 | 2 | 2 | 2 | 2 | 2 | 2 |
| Mica | 3 | 3 | 3 | 3 | 3 | 3 | 3 | 3 |
| Polyvinyl alcohol resin | 1 | 1 | 1 | 1 | 1 | 1 | 1 | 1 |

It should be understood based on this disclosure that various other modifications can be made by those in the art based on these illustrated embodiments.

Embodiment 1

Examples 1-16 and Comparisons 1-11 will be illustrated by Embodiment 1 of the present invention.

Table 1

Table 1 shows the compositions of the raw materials used in Examples 1 to 16 according to the present invention.

The raw materials are mixed in the composition shown in the table, and water is added thereto to give the slurry of raw materials having a solid concentration of 10% by mass.

Table 2 shows physical properties of the products of Examples 1 to 16 according to the present invention.

Bending strength and Young's modulus are measured using a test piece of 70×200 mm (according to JIS A 1408).

Elongation ratio through water absorption is an elongation ratio of a test piece before and after absorption of water caused by air conditioning the test piece at 60° C. for 3 days and then immersing it in water for 8 days to allow absorption of water.

Contraction ratio through moisture effusion is a contraction ratio of a test piece before and after moisture effusion caused by air conditioning the test piece at 20° C. under RH of 60% for 10 days and then drying it at 80° C. for 10 days to allow moisture effusion.

Microcracking test (cycle) means the number of cycles until cracks occur, wherein one cycle consists of a water absorption-drying procedure repeated 3 times in one week, said procedure consisting of carbonation for 4 days, water absorption for 7 hours and drying at 120° C. for 17 hours.

Freezing and fusion resistance is a percentage of expansion in thickness after 300 cycles according to ASTM C166-B method.

Example 2

The fiber reinforced cement product of Example 2, in which the amount of fly ash is 28% by mass and the amount of finely dividing fly ash is 28% by mass, has excellent physical properties such as bending strength, elongation ratio

TABLE 2

| Physical property | Example 1 | Example 2 | Example 3 | Example 4 | Example 5 | Example 6 | Example 7 | Example 8 |
|---|---|---|---|---|---|---|---|---|
| Absolute dry specific gravity | 1.25 | 1.23 | 1.2 | 1.27 | 1.24 | 1.21 | 1.26 | 1.23 |
| Young's modulus (kN/mm$^2$) | 6.7 | 4.9 | 4.1 | 7.8 | 5.3 | 4.6 | 7.1 | 5.0 |
| Bending strength (N/mm$^2$) | 21.3 | 19.7 | 18.2 | 22.5 | 20.6 | 19.3 | 21.4 | 20.3 |
| Elongation ratio through water absorption (%) | 0.11 | 0.12 | 0.13 | 0.10 | 0.12 | 0.13 | 0.10 | 0.12 |
| Contraction ratio through moisture effusion (%) | 0.12 | 0.13 | 0.14 | 0.11 | 0.12 | 0.13 | 0.11 | 0.13 |
| Microcracking test (cycle) | 8 | 10 | 10 | 8 | 10 | 10 | 8 | 10 |
| Freezing and fusion resistance (%) | 0.9 | 1.5 | 1.8 | 0.6 | 1.2 | 1.5 | 0.8 | 1.4 |
| Nail performance | ○ | ○ | ○ | ○ | ○ | ○ | ○ | ○ |
| Presence or absence of crystalline silica | Scarcely present | Scarcely present | Scarcely present | Scarcely present | Scarcely present | Scarcely present | Scarcely present | Scarcely present |

| Physical property | Example 9 | Example 10 | Example 11 | Example 12 | Example 13 | Example 14 | Example 15 | Example 16 |
|---|---|---|---|---|---|---|---|---|
| Absolute dry specific gravity | 1.20 | 1.26 | 1.24 | 1.21 | 1.28 | 1.25 | 1.23 | 1.24 |
| Young's modulus (kN/mm$^2$) | 4.4 | 7.2 | 5.7 | 4.8 | 8.2 | 6.9 | 4.8 | 4.9 |
| Bending strength (N/mm$^2$) | 19 | 21.6 | 20.7 | 19.8 | 23.4 | 21.5 | 19.6 | 19.8 |
| Elongation ratio through water absorption (%) | 0.13 | 0.10 | 0.11 | 0.12 | 0.09 | 0.11 | 0.12 | 0.12 |
| Contraction ratio through moisture effusion (%) | 0.14 | 0.11 | 0.12 | 0.14 | 0.10 | 0.12 | 0.13 | 0.13 |
| Microcracking test (cycle) | 10 | 8 | 10 | 10 | 8 | 8 | 10 | 10 |
| Freezing and fusion resistance (%) | 1.8 | 0.8 | 1.1 | 1.7 | 0.5 | 0.9 | 1.6 | 1.4 |
| Nail performance | ○ | ○ | ○ | ○ | ○ | ○ | ○ | ○ |
| Presence or absence of crystalline silica | Scarcely present | Scarcely present | Scarcely present | Scarcely present | Scarcely present | Scarcely present | Scarcely present | Scarcely present |

Nailing performance is determined by observing generation of cracks when two fiber reinforced cement products which are laid to overlap with each other by 30 mm according to the lap boarding are pegged with nails of 2.3 mm in diameter and 38 mm in length by means of a nailer gun at the positions of the overlapped part of the products 20 mm inside from the edges of the overlapped part in the longitudinal direction and in the shorter direction in compliance with actual installation.

The mark "○" denotes no cracking and the mark "×" denotes generation of cracks.

The presence of crystalline silica was determined by appearance of the peaks observed in crystalline silica such as quartz, tridymite or cristobalite in an X-ray diffraction.

Example 1

The fiber reinforced cement product of Example 1, in which the amount of fly ash is 14% by mass and the amount of finely dividing fly ash is 42% by mass, has excellent physical properties such as bending strength, elongation ratio through water absorption, contraction ratio through moisture effusion, microcracking test, freezing and fusion resistance, nail performance.

through water absorption, contraction ratio through moisture effusion, microcracking test, freezing and fusion resistance, nail performance.

Example 3

The fiber reinforced cement product of Example 3, in which the amount of fly ash is 42% by mass and the amount of finely dividing fly ash is 14% by mass, has a slightly poor freezing and fusion resistance but has excellent physical properties such as bending strength, elongation ratio through water absorption, contraction ratio through moisture effusion, microcracking test, nail performance.

Example 4

The fiber reinforced cement product of Example 4, in which the amount of pearlstone is 14% by mass and the amount of finely dividing pearlstone is 42% by mass, has excellent physical properties such as bending strength, elongation ratio through water absorption, contraction ratio through moisture effusion, microcracking test, freezing and fusion resistance, nail performance.

Example 5

The fiber reinforced cement product of Example 5, in which the amount of pearlstone is 28% by mass and the amount of finely dividing pearlstone is 28% by mass, has excellent physical properties such as bending strength, elongation ratio through water absorption, contraction ratio through moisture effusion, microcracking test, freezing and fusion resistance, nail performance.

Example 6

The fiber reinforced cement product of Example 6, in which the amount of pearlstone is 42% by mass and the amount of finely dividing pearlstone is 14% by mass, has excellent physical properties such as bending strength, elongation ratio through water absorption, contraction ratio through moisture effusion, microcracking test, freezing and fusion resistance, nail performance.

Example 7

The fiber reinforced cement product of Example 7, in which the amount of fly ash is 14% by mass and the amount of finely dividing peralstone is 42% by mass, has excellent physical properties such as bending strength, elongation ratio through water absorption, contraction ratio through moisture effusion, microcracking test, freezing and fusion resistance, nail performance.

Example 8

The fiber reinforced cement product of Example 8, in which the amount of fly ash is 28% by mass and the amount of finely dividing pearlstone is 28% by mass, has excellent physical properties such as bending strength, elongation ratio through water absorption, contraction ratio through moisture effusion, microcracking test, freezing and fusion resistance, nail performance.

Example 9

The fiber reinforced cement product of Example 9, in which the amount of fly ash is 42% by mass and the amount of finely dividing pearlstone is 14% by mass, has a slightly poor freezing and fusion resistance but has excellent physical properties such as bending strength, elongation ratio through water absorption, contraction ratio through moisture effusion, microcracking test, nail performance.

Example 10

The fiber reinforced cement product of Example 10, in which the amount of finely dividing fly ash is 42% by mass and the amount of pearlstone is 14% by mass, has excellent physical properties such as bending strength, elongation ratio through water absorption, contraction ratio through moisture effusion, microcracking test, freezing and fusion resistance, nail performance.

Example 11

The fiber reinforced cement product of Example 11, in which the amount of finely dividing fly ash is 28% by mass and the amount of pearlstone is 28% by mass, has excellent physical properties such as bending strength, elongation ratio through water absorption, contraction ratio through moisture effusion, microcracking test, freezing and fusion resistance, nail performance.

Example 12

The fiber reinforced cement product of Example 12, in which the amount of finely dividing fly ash is 14% by mass and the amount of pearlstone is 42% by mass, has a slightly poor freezing and fusion resistance but has excellent physical properties such as bending strength, elongation ratio through water absorption, contraction ratio through moisture effusion, microcracking test, nail performance.

Example 13

The fiber reinforced cement product of Example 13, in which the amount of finely dividing fly ash is 14% by mass and the amount of pearlstone is 34% by mass and the amount of silica fume is 8% by mass, has excellent physical properties such as bending strength, elongation ratio through water absorption, contraction ratio through moisture effusion, microcracking test, freezing and fusion resistance, nail performance.

Example 14

The fiber reinforced cement product of Example 14, in which the amount of finely dividing fly ash is 28% by mass and the amount of fly ash is 20% by mass and the amount of blast furnace slag is 8% by mass, has excellent physical properties such as bending strength, elongation ratio through water absorption, contraction ratio through moisture effusion, microcracking test, freezing and fusion resistance, nail performance.

Example 15

The fiber reinforced cement product of Example 15, in which the amount of finely dividing obsidian is 28% by mass and the amount of fly ash is 28% by mass, has excellent physical properties such as bending strength, elongation ratio through water absorption, contraction ratio through moisture effusion, microcracking test, freezing and fusion resistance, nail performance.

Example 16

The fiber reinforced cement product of Example 14, in which the amount of finely dividing pearlstone is 28% by mass and the amount of bottom ash is 28% by mass, has excellent physical properties such as bending strength, elongation ratio through water absorption, contraction ratio through moisture effusion, microcracking test, freezing and fusion resistance, nail performance.

Table 3

Table 3 shows the compositions of the raw materials of Comparisons 1 to 11 in which the fiber reinforced cement products were manufactured by a process similar to that in the examples.

Table 4

Table 4 shows various physical properties of the fiber reinforced cement products of Comparisons 1 to 11 in which the fiber reinforced cement products were measured in a manner similar to that in the examples.

Comparison 1

The fiber reinforced cement product of Comparison 1, in which siliceous materials is only fly ash and the amount of fly ash is 56% by mass, has a low absolute dry specific gravity, and has poor physical properties such as bending strength, elongation ratio through water absorption,

TABLE 3

| Raw material composition (% by mass) | Comparison 1 | Comparison 2 | Comparison 3 | Comparison 4 | Comparison 5 | Comparison 6 | Comparison 7 | Comparison 8 | Comparison 9 | Comparison 10 | Comparison 11 |
|---|---|---|---|---|---|---|---|---|---|---|---|
| Portland cement | 30 | 30 | 30 | 30 | 30 | 30 | 30 | 30 | 30 | 30 | 30 |
| Fly ash | 56 | 0 | 0 | 0 | 42 | 28 | 14 | 42 | 28 | 14 | 0 |
| Finely dividing fly ash | 0 | 56 | 0 | 0 | 0 | 0 | 0 | 0 | 0 | 0 | 0 |
| Pearlstone | 0 | 0 | 56 | 0 | 14 | 28 | 42 | 0 | 0 | 0 | 0 |
| Finely dividing pearlstone | 0 | 0 | 0 | 56 | 0 | 0 | 0 | 0 | 0 | 0 | 0 |
| Finely dividing obsidian | 0 | 0 | 0 | 0 | 0 | 0 | 0 | 0 | 0 | 0 | 0 |
| bottom ash | 0 | 0 | 0 | 0 | 0 | 0 | 0 | 0 | 0 | 0 | 0 |
| Blast furnace slag | 0 | 0 | 0 | 0 | 0 | 0 | 0 | 0 | 0 | 0 | 28 |
| Silica fume | 0 | 0 | 0 | 0 | 0 | 0 | 0 | 14 | 28 | 42 | 28 |
| NUKP | 8 | 0 | 4 | 8 | 8 | 8 | 8 | 8 | 8 | 8 | 8 |
| NBKP | 0 | 8 | 4 | 0 | 0 | 0 | 0 | 0 | 0 | 0 | 0 |
| Used newspaper | 2 | 2 | 2 | 2 | 2 | 2 | 2 | 2 | 2 | 2 | 2 |
| Mica | 3 | 3 | 3 | 3 | 3 | 3 | 3 | 3 | 3 | 3 | 3 |
| Polyvinyl alcohol resin | 1 | 1 | 1 | 1 | 1 | 1 | 1 | 1 | 1 | 1 | 1 |

TABLE 4

| Physical property | Comparison 1 | Comparison 2 | Comparison 3 | Comparison 4 | Comparison 5 | Comparison 6 | Comparison 7 | Comparison 8 | Comparison 9 | Comparison 10 | Comparison 11 |
|---|---|---|---|---|---|---|---|---|---|---|---|
| Absolute dry specific gravity | 1.09 | 1.35 | 1.13 | 1.39 | 1.10 | 1.11 | 1.12 | 1.30 | 1.38 | 1.44 | 1.40 |
| Young's modulus (kN/mm$^2$) | 3.1 | 10.6 | 4.2 | 11.5 | 3.2 | 3.5 | 4.0 | 8.5 | 12.0 | 13.8 | 12.3 |
| Bending strength (N/mm$^2$) | 12.3 | 24.1 | 14.4 | 26.0 | 12.5 | 12.9 | 14.1 | 23.7 | 25.4 | 25.8 | 25.5 |
| Elongation ratio through water absorption (%) | 0.18 | 0.08 | 0.17 | 0.08 | 0.18 | 0.18 | 0.17 | 0.09 | 0.08 | 0.08 | 0.08 |
| Contraction ratio through moisture effusion (%) | 0.21 | 0.09 | 0.19 | 0.09 | 0.21 | 0.20 | 0.19 | 0.10 | 0.09 | 0.08 | 0.09 |
| Microcracking test (cycle) | 10 | 4 | 10 | 3 | 10 | 10 | 10 | 2 | 1 | 1 | 1 |
| Freezing and fusion resistance (%) | 7.7 | 0.3 | 7.3 | 0.3 | 7.6 | 7.4 | 7.3 | 0.4 | 0.3 | 0.2 | 0.3 |
| Nail performance | ○ | X | ○ | X | ○ | ○ | ○ | X | X | X | X |
| Presence or absence of crystalline silica | present | Scarcely present | present | Scarcely present | Scarcely present | Scarcely present | Scarcely present | Scarcely present | Scarcely present | Scarcely present | Scarcely present | contraction ratio through moisture effusion, freezing and fusion resistance.

Comparison 2

The fiber reinforced cement product of Comparison 2, in which siliceous materials is only finely dividing fly ash and the amount of finely dividing fly ash is 56% by mass, and has poor physical properties such as microcracking test, nail performance, and product is hard and fragile.

Comparison 3

The fiber reinforced cement product of Comparison 3, in which siliceous materials is only pearlstone and the amount of pearlstone is 56% by mass, has a low absolute dry specific gravity, and has poor physical properties such as bending strength, elongation ratio through water absorption, contraction ratio through moisture effusion, freezing and fusion resistance.

Comparison 4

The fiber reinforced cement product of Comparison 4, in which siliceous materials is only finely dividing pearlstone and the amount of finely dividing pearlstone is 56% by mass, and has poor physical properties such as microcracking test, nail performance, and product is hard and fragile.

Comparison 5

The fiber reinforced cement product of Comparison 5, in which siliceous materials is pearlstone and fly ash, the amount of pearlstone is 14% by mass and the amount of fly ash is 42% by mass, has a low absolute dry specific gravity, and has poor physical properties such as bending strength, elongation ratio through water absorption, contraction ratio through moisture effusion, freezing and fusion resistance.

Comparison 6

The fiber reinforced cement product of Comparison 6 in which siliceous materials is pearlstone and fly ash, the amount of pearlstone is 28% by mass and the amount of fly ash is 28% by mass, has a low absolute dry specific gravity, and has poor physical properties such as bending strength, elongation ratio through water absorption, contraction ratio through moisture effusion, freezing and fusion resistance.

Comparison 7

The fiber reinforced cement product of Comparison 7, in which siliceous materials is pearlstone and fly ash, the amount of pearlstone is 42% by mass and the amount of fly ash is 14% by mass, has a low absolute dry specific gravity, and has poor physical properties such as bending strength, elongation ratio through water absorption, contraction ratio through moisture effusion, freezing and fusion resistance.

Comparison 8

The fiber reinforced cement product of Comparison 8, in which siliceous materials is fly ash and silica fume, the amount of fly ash is 42% by mass and the amount of silica fume is 14% by mass, and has poor physical properties such as microcracking test, nail performance, and product is hard and fragile.

Comparison 9

The fiber reinforced cement product of Comparison 9, in which siliceous materials is fly ash and silica fume, the amount of fly ash is 28% by mass and the amount of silica fume is 28% by mass, and has poor physical properties such as microcracking test and nail performance, and product is hard and fragile.

Comparison 10

The fiber reinforced cement product of Comparison 10, in which siliceous materials is fly ash and silica fume, the amount of fly ash is 14% by mass and the amount of silica fume is 42% by mass, and has poor physical properties such as microcracking test and nail performance, and product is hard and fragile.

Comparison 11

The fiber reinforced cement product of Comparison 11, in which siliceous materials is blast furnace slag and silica fume, the amount of blast furnace slag is 28% by mass and the amount of silica fume is 28% by mass, and has poor physical properties such as microcracking test and nail performance, and product is hard and fragile.

What is claimed is:

1. A fiber reinforced cement composition comprising the following raw materials:
    not less than 25% by mass and not more than 45% by mass of a hydraulic inorganic material;
    not less than 50% by mass and not more than 65% by mass of a siliceous material;
    not less than 5% by mass and not more than 12% by mass of a woody reinforcement;
    not less than 1% by mass and not more than 7% by mass of mica; and
    not less than 0.25% by mass and not more than 1.5% by mass of polyvinyl alcohol resin, wherein
    the hydraulic inorganic material is a portland cement,
    the siliceous material is a mixture of burned ash of coal and/or rhyolite having an average particle size of not less than 15 μm and not more than 50 μm and burned ash of coal and/or rhyolite having an average particle size of not less than 1 μm and not more than 15 μm, and
    a woody reinforcement is needle-leaves-tree unbleached haft pulp and/or needle-leaves-tree bleached kraft pulp and used newspaper.

2. The fiber reinforced cement composition according to claim 1, wherein burned ash of coal is fly ash and rhyolite is pearlstone.

3. The fiber reinforced cement composition according to claim 1, wherein the woody reinforcement is a mixture of the needle-leaves-tree unbleached kraft pulp and/or the needle-leaves-tree bleached kraft pulp and the used newspaper in a ratio of the the needle-leaves-tree unbleached kraft pulp and/or the needle-leaves-tree bleached kraft pulp to the used newspaper in a range of from 1:1 to 4:1.

4. A fiber reinforced cement composition comprising the following raw materials:
    not less than 25% by mass and not more than 45% by mass of the hydraulic inorganic material;
    not less than 5% by mass and not more than 12% by mass of the woody reinforcement;
    not less than 50% by mass and not more than 65% by mass of the siliceous material;
    not less than 1% by mass and not more than 7% by mass of mica; and
    not less than 0.25% by mass and not more than 1.5% by mass of polyvinyl alcohol resin, wherein
    the hydraulic inorganic material is a portland cement,
    the siliceous material comprises burned ash of coal and/or rhyolite having an average particle size of not less than 1 μm and not more than 15 μm and burned ash of coal and/or rhyolite having an average particle size of not less than 15 μm and not more than 50 μm, the amount of the burned ash of coal and/or the rhyolite having the average particle size of not less than 1 μm and not more than 15 μm being not less than 25% by mass and not more than 75% by mass of the whole siliceous material, and
    a woody reinforcement is needle-leaves-tree unbleached kraft pulp and/or needle-leaves-tree bleached kraft pulp and used newspaper.

5. A fiber reinforced cement composition comprising the following raw materials:
    not less than 25% by mass and not more than 45% by mass of the hydraulic inorganic material;
    not less than 5% by mass and not more than 12% by mass of the woody reinforcement;
    not less than 50% by mass and not more than 65% by mass of the siliceous material;
    not less than 1% by mass and not more than 7% by mass of mica; and
    not less than 0.25% by mass and not more than 1.5% by mass of polyvinyl alcohol resin, wherein
    the hydraulic inorganic material is a portland cement,
    the woody reinforcement is a mixture of needle-leaves-tree unbleached kraft pulp and/or the needle-leaves-tree bleached kraft pulp and used newspaper in a ratio of the needle-leaves-tree unbleached kraft pulp and/or the needle-leaves-tree bleached kraft pulp to the used newspaper in a range of from 1:1 to 4:1,
    the siliceous material comprises fly ash and/or pearlstone having an average particle size of not less than 15 μm and not more than 50 μm and fly ash and/or pearlstone having an average particle size of not less than 1 μm and not more than 15 μm, the amount of the fly ash and/or the pearlstone having the average particle size of not less than 1 μm and not more than 15 μm being not less than 25% by mass and not more than 75% by mass of the whole siliceous material.

6. The fiber reinforced cement product manufactured from the fiber reinforced cement composition according to claim 4.

7. The fiber reinforced cement product manufactured from the fiber reinforced cement composition according to claim 5.

8. A process for manufacturing the fiber reinforced cement product comprising the steps of:
    dispersing in water a fiber reinforced cement composition comprising the following raw materials:
    not less than 25% by mass and not more than 45% by mass of a hydraulic inorganic material;

not less than 50% by mass and not more than 65% by mass of a siliceous material;

not less than 5% by mass and not more than 12% by mass of a woody reinforcement;

not less than 1% by mass and not more than 7% by mass of mica; and not less than 0.25% by mass and not more than 1.5% by mass of polyvinyl alcohol resin, wherein the hydraulic inorganic material is a portland cement, the siliceous material is a mixture of burned ash of coal and/or rhyolite having an average particle size of not less than 15 µm and not more than 50 µm and burned ash of coal and/or rhyolite having an average particle size of not less than 1 µm and not more than 15 µm, and a woody reinforcement is needle-leaves-tree unbleached kraft pulp and/or needle-leaves-tree bleached kraft pulp and used newspaper, so as to give a slurry of the raw materials;

forming a green mat from the slurry; and pressing the green mat by press molding and thereafter curing the mat in an autoclave.

9. A process for manufacturing the fiber reinforced cement product comprising the steps of:

dispersing in water a fiber reinforced cement composition comprising the following raw materials:

not less than 25% by mass and not more than 45% by mass of the hydraulic inorganic material;

not less than 5% by mass and not more than 12% by mass of the woody reinforcement;

not less than 50% by mass and not more than 65% by mass of the siliceous material;

not less than 1% by mass and not more than 7% by mass of mica; and not less than 0.25% by mass and not more than 1.5% by mass of polyvinyl alcohol resin, wherein the hydraulic inorganic material is a portland cement, the siliceous material comprises burned ash of coal and/or rhyolite having an average particle size of not less than 1 µm and not more than 15 µm and burned ash of coal and/or rhyolite having an average particle size of not less than 15 µm and not more than 50 µm, the amount of the burned ash of coal and/or the rhyolite having the average particle size of not less than 1 µm and not more than 15 µm being not less than 25% by mass and not more than 75% by mass of the whole siliceous material, and a woody reinforcement is needle-leaves-tree unbleached kraft pulp and/or needle-leaves-tree bleached kraft pulp and used newspaper, so as to give a slurry of the raw materials;

forming a green mat from the slurry; and pressing the green mat by press molding and thereafter curing the mat in an autoclave.

10. A process for manufacturing the fiber reinforced cement product comprising the steps of:

dispersing in water a fiber reinforced cement composition comprising the following raw materials:

not less than 25% by mass and not more than 45% by mass of the hydraulic inorganic material;

not less than 5% by mass and not more than 12% by mass of the woody reinforcement;

not less than 50% by mass and not more than 65% by mass of the siliceous material;

not less than 1% by mass and not more than 7% by mass of mica; and not less than 0.25% by mass and not more than 1.5% by mass of polyvinyl alcohol resin, wherein the hydraulic inorganic material is a portland cement, the woody reinforcement is a mixture of needle-leaves-tree unbleached kraft pulp and/or the needle-leaves-tree bleached kraft pulp and used newspaper in a ratio of the needle-leaves-tree unbleached kraft pulp and/or the needle-leaves-tree bleached kraft pulp to the used newspaper in a range of from 1:1 to 4:1, the siliceous material comprises fly ash and/or pearlstone having an average particle size of not less than 15 µm and not more than 50 µm and fly ash and/or pearlstone having an average particle size of not less than 1 µm and not more than 15 µm, the amount of the fly ash and/or the pearlstone having the average particle size of not less than 1 µm and not more than 15 µm being not less than 25% by mass and not more than 75% by mass of the whole siliceous material, so as to give a slurry of the raw materials;

forming a green mat from the slurry; and pressing the green mat by press molding and thereafter curing the mat in an autoclave.

\* \* \* \* \*